United States Patent [19]
Bow

[11] 3,834,133
[45] Sept. 10, 1974

[54] DIRECT CONTACT CONDENSER HAVING AN AIR REMOVAL SYSTEM

[75] Inventor: William J. Bow, Morristown, N.J.

[73] Assignee: Foster Wheeler Corporation, Livingston, N.J.

[22] Filed: Dec. 22, 1972

[21] Appl. No.: 317,862

[52] U.S. Cl............. 55/257, 55/39, 55/267, 165/60, 261/36 A, 261/72 A, 261/118
[51] Int. Cl............................................. B01d 57/00
[58] Field of Search.......... 165/60, 111; 55/39, 159, 55/190, 192, 193, 257, 267; 261/118, 117, 36 A, 72 A, 111, 114

[56] References Cited
UNITED STATES PATENTS

| | | | |
|---|---|---|---|
| 2,858,903 | 11/1958 | Goetz et al. | 261/117 X |
| 2,939,685 | 6/1960 | Worn et al. | 261/111 X |
| 2,956,784 | 10/1960 | Parkinson | 55/193 X |

*Primary Examiner*—Frank W. Lutter
*Assistant Examiner*—William Cuchlinski, Jr.
*Attorney, Agent, or Firm*—Marvin A. Naigur; John E. Wilson; John P. De Luca

[57] ABSTRACT

A direct contact condenser in which a plurality of streams of water are discharged in a housing in a heat exchange relationship with steam passing therethrough to condense a portion of the steam. The condensed steam is reheated by redirecting the noncondensed steam in a heat exchange relation therewith, to remove air and other non-condensible gases from the condensed steam.

7 Claims, 2 Drawing Figures

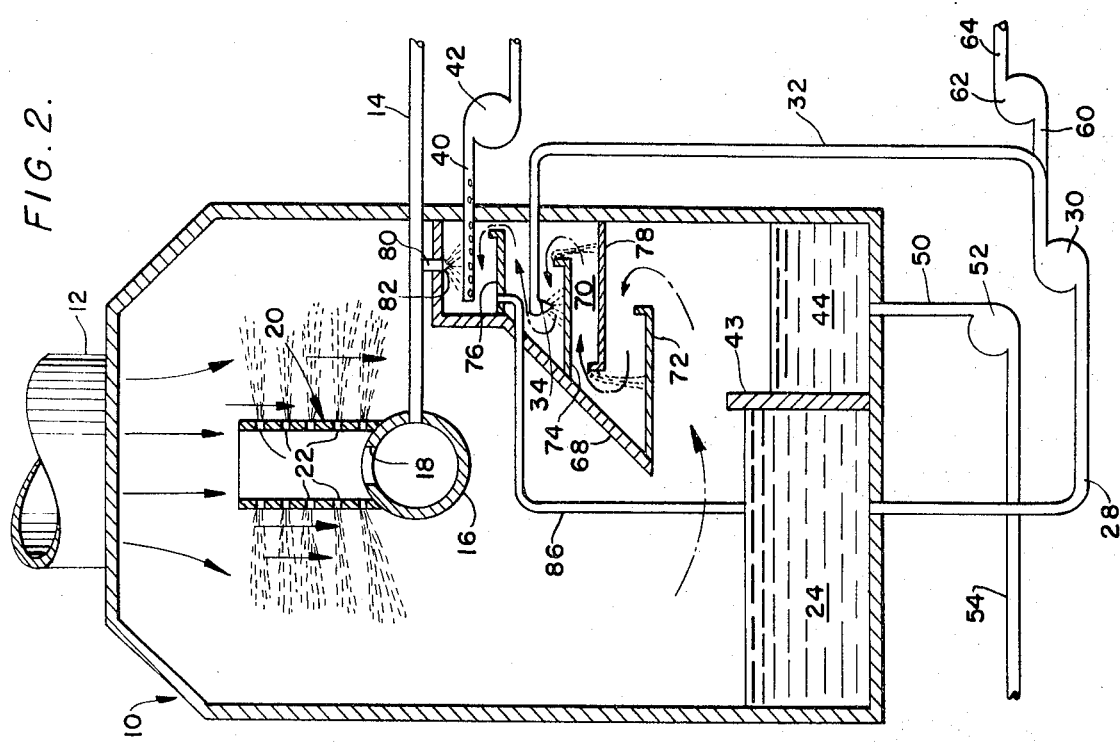
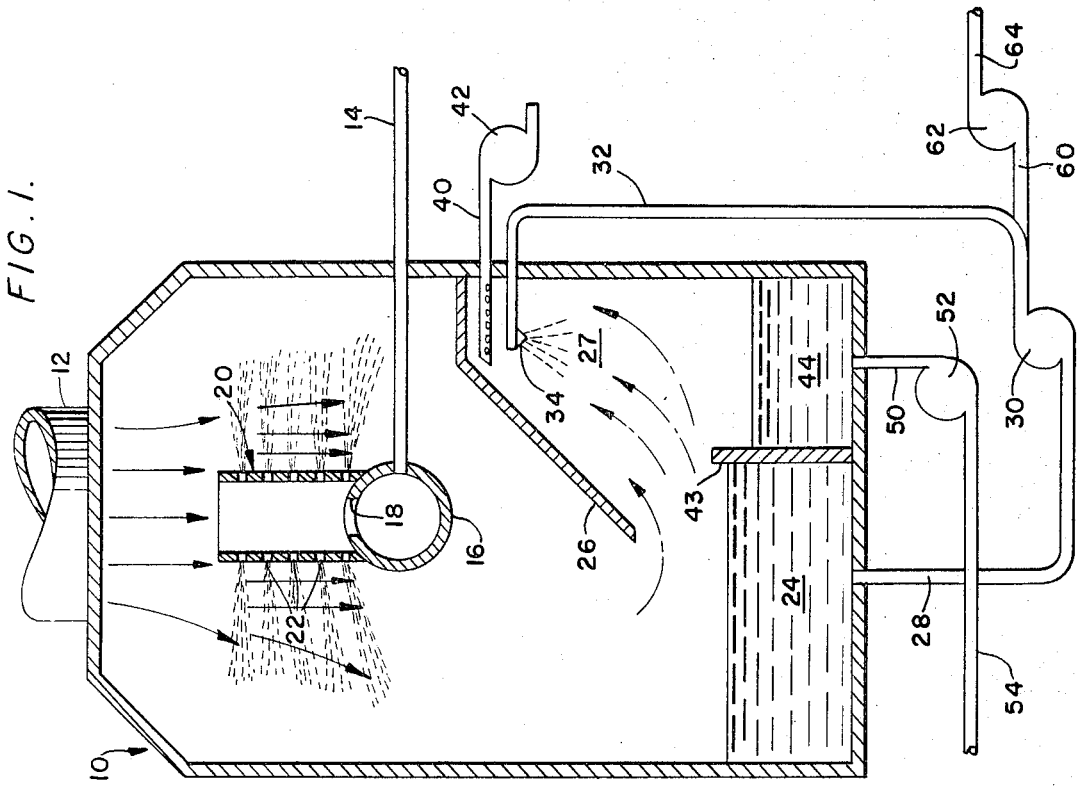

DIRECT CONTACT CONDENSER HAVING AN AIR REMOVAL SYSTEM

BACKGROUND OF THE INVENTION

This invention relates to a condenser, and more particularly, to a direct contact spray condenser for effecting a heat exchange between steam and water.

Several types of condensers are now in use for transferring heat between two fluids, such as steam and water, for use in power plants or other similar environments. One popular type of condenser is the surface condenser in which water is passed through a series of tubes within a shell, and steam is passed through the shell in a heat exchange relationship with the water. In these arrangements since the water is isolated from the steam during the heat transfer, the condensed steam is relatively free of air and other non-condensible gases which are present in the water and which are undesirable since they can cause corrosion, and the like, as well as "blanket" the condenser and thus reduce its effectiveness. However, these arrangements are relatively expensive to manufacture and are relatively inefficient from a heat transfer standpoint.

In order to provide a more direct heat transfer between the two fluids, direct contact type condensers are also used. In these arrangements, water is discharged into the shell in the form of one or more streams of finely divided droplets in the path of the steam, to condense the steam and heat the water close to its boiling temperature. As a result, a relatively high degree of heat transfer is possible. However, these direct contact arrangements suffer from the fact that the non-condensibles from the water form in the shell and must be removed to prevent the above-mentioned blanketing, and reduce corrosion and other deterioration of the equipment.

SUMMARY OF THE INVENTION

It is, therefore, an object of the present invention to provide a direct contact condenser which enjoys a relatively high heat transfer efficiency yet substantially eliminates air and other non-condensible gases.

Toward the fulfillment of this and other objects, the condenser of the present invention comprises a housing, means to discharge a plurality of streams of water in said housing, means for passing steam in direct contact with said water to condense at least a portion of said steam, means for heating a portion of said condensed portion of said steam to remove the non-condensibles therefrom, and means for removing said portion of said condensed portion of said steam from said housing after the non-condensibles have been removed therefrom.

BRIEF DESCRIPTION OF THE DRAWINGS

FIG. 1 is a sectional view depicting one form of the condenser of the present invention; and FIG. 2 is a view similar to FIG. 1 but depicting an alternate form of the condenser of the present invention.

DESCRIPTION OF THE PREFERRED EMBODIMENTS

One form of the condenser of the present invention is shown in cross section in FIG. 1 and includes a housing 10 having an inlet 12 for receiving steam from an external source and for directing the steam downwardly through the housing 10, as shown by the solid arrows.

A pipe 14 is provided for introducing water from an external source into the housing 10, and registers with a relatively large diameter pipe 16 disposed in the housing and having an opening 18 formed in the upper portion thereof as viewed in FIG. 1. A hollow partition 20 having a plurality of openings 22 formed through the sidewalls thereof, is mounted on top of the pipe 16 to receive water therefrom. As a result, water introduced into the partition 20 via the pipes 14 and 16 is sprayed through the openings 22 outwardly across the housing 10 and in the path of the steam passing therethrough. Due to the resulting transfer of heat from the steam to the water, a substantial portion of the steam will be condensed, with the mixture of water and condensate falling into a well 24 located at the floor of the housing 10.

A partition 26 is disposed in the housing 10, and together with one sidewall of the housing, defines a deaerating section shown in general by the reference numeral 27. This deaeration section 27 receives steam not condensed by the water discharging from the partition 20 as discussed above, with the convective flow of this latter steam being shown by the dashed arrows.

An outlet pipe 28 extends from the well 24 and is directed to a pipe 32 after one stage of pumping via a pump stage 30 to a nozzle 34 for passing the water-condensate mixture from the well to the nozzle 34 and discharging it outwardly in the section 27. An air offtake, or vent, in the form of a perforated pipe 40, is provided in the section 27 and is adapted to receive air and the other non-condensible gases from the water-condensate mixture, as will be described in detail later, and direct same outwardly from the housing 10 by a vacuum pump 42.

A partition 43 extends upwardly from the floor of the housing 10 and forms a well 44 adjacent the well 24. A pipe 50 extends from the well 44 to an externally disposed pump 52 for directing the deaerated reheated water-condensate mixture from the well through a pipe 54, and to an external unit such as a feedwater heater, or the like.

A pipe 60 connects a pump 62, which provides additional stages of pumping, with the pipe 32 for directing a portion of the water-condensate mixture from the well 24, through a pipe 64 and to another external unit. In a preferred embodiment, the latter external unit would be in the form of a cooling tower, or the like, which cools the mixture to an extent that it can be fed to the pipe 14 and into the housing 10 for discharge through the hollow partition 20, as discussed above.

In operation, a portion of the steam passing into the housing 10 through the inlet 12 is condensed as a result of its heat exchange with the relatively cool water discharging from the hollow partition 20. The resulting water-condensate mixture, including air and other non-condensible gases trapped therein, falls into the well 24 whereby a portion thereof is drawn off by the pump 30 via the pipes 28 and 32 and discharged by the nozzle 34 into the deaerating section 27.

The portion of the steam in the housing 10 not condensed in the above manner flows upwardly by convection into the section 27 as shown by the dashed arrows, whereby it heats the water-condensate mixture spraying from the nozzle 34 to a temperature that will cause the non-condensibles in the mixture to be separated therefrom. The non-condensibles are removed from the housing 10 by means of the pipe 40 and the vacuum pump 42, and the remaining deaerated mixture will fall into the well 44. The pump 52 operates to draw the deaerated mixture from the well 44 via the pipe 50 and direct same via the pipe 54 to a feedwater heater or the like.

The pump 62 receives a portion of the water-condensate mixture from the well 24 via the pipes 28 and 60, and directs same, via the pipe 64, to a cooling tower or the like for providing water for the inlet 14 as discussed above.

It is thus seen that the condenser of FIG. 1 enjoys a relatively efficient heat transfer, while producing a substantially deaerated water-condensate mixture for further use.

The embodiment of FIG. 2 is similar to that of FIG. 1 with identical structure being given the same reference numerals. According to the embodiment of FIG. 2, a partition 68 is provided which defines a deaerating section 70 and which has a pair of horizontally extending baffles 72 and 74, as well as a tray 76, extending therefrom and into the section 70. A baffle 78 extends from the sidewall of the housing 10 and between the baffles 72 and 74. The perforated vent pipe 40 is located above the tray 76, and the nozzle 34 is located above the baffle 74.

A pipe 80 connects the inlet pipe 14 to a nozzle 82 which is disposed above the vent pipe 40 for discharging cold water into the upper portion of the section 70. A drain line 86 is provided between the tray 76 and the well 24 to drain the water from the nozzle 82 that forms on the tray 76.

In operation, a water-condensate mixture is formed as a result of steam passing into the housing 10 via the inlet 12 and condensing as a result of its heat exchange with the water discharging from the partition 20. This mixture falls into the well 24 and is drawn therefrom and discharged into the section 70 by the nozzle 34 as described in the previous embodiment. Steam not condensed as a result of the foregoing passes upwardly into the section 70 as shown by the dashed arrows, where it winds through the baffles 72, 74, and 78 and passes in a heat exchange relation with the water-condensate mixture discharging from the nozzle 34 and dripping down from the baffles 72, 74, and 78. This heats the mixture to a temperature that releases its non-condensibles, which are withdrawn from the section 70 through the pipe 40.

Cold water discharging from the nozzle 82 aids in cooling the portion of the steam that rises to the upper portion of the section 70 and, in addition, reduces the volume of the non-condensibles to decrease the load on the vacuum pump 42. This cool water is collected by the tray 76 and is discharged to the well 24 via the line 86. The presence of the baffles 72, 74, and 78 increases the heat exchange between the water-condensate mixture dripping thereoff and the steam passing through the section 70.

Of course, other variations of the specific construction and arrangement of the condensers disclosed above can be made by those skilled in the art without departing from the invention as defined in the appended claims.

I claim:

1. A condenser comprising:
   a housing;
   means including at least one hollow partition disposed in said housing and having a plurality of through openings formed in a wall thereof for discharging a plurality of streams of water in said housing;
   means for passing steam in direct contact with said water to condense at least a portion of said steam, said condensed steam falling into a well portion defined in said housing and further comprising conduit means for passing said condensed steam from said well portion;
   means in said housing for heating a portion of said condensed portion of said steam to remove the non-condensibles therefrom, including means defining a deaerating section in said housing for receiving steam not condensed as a result of said contact with said water, a nozzle disposed in said deaerating section for receiving said portion of said condensed portion of said steam from said conduit means and discharging same towards said noncondensed steam in heat exchange therewith and vent means for removing said non-condensibles from said housing;
   and means for moving said portion of said condensed portion of said steam from said housing after the non-condensibles have been removed therefrom.

2. The condenser of claim 1 including conduit means for directing said water from an external source to the hollow portion of said partition.

3. The condenser of claim 2 further comprising: means for connecting said nozzle to said conduit means for directing said water to said nozzle for discharging said water in the upper portion of said deaerating section to displace said non-condensibles out said vent.

4. The condenser of claim 1 further comprising a plurality of baffles in said deaerating section for defining a path for said steam.

5. The condenser of claim 1 wherein said water also passes into said well portion after said contact with said steam, said passing means adapted to pass a mixture of said water and said condensed steam to said nozzle.

6. The condenser of claim 1 wherein a well portion is defined in said housing for receiving a mixture of said water and said condensed steam, and further comprising first pump means for directing a portion of said mixture to said deaerating section for passage in said heat exchange relation with said non-condensed steam, and second pump means for directing another portion of said mixture to a cooling tower for passage to said discharging means.

7. The condenser of claim 6 further comprising means for discharging a portion of said other portion of said mixture into said deaerating section, and means for directing said later portion from said deaerating section to said well.

* * * * *